(12) United States Patent
Nakazawa et al.

(10) Patent No.: US 7,736,039 B2
(45) Date of Patent: Jun. 15, 2010

(54) VEHICLE LAMP

(75) Inventors: Hideaki Nakazawa, Shizuoka (JP); Yasuyuki Kato, Shizuoka (JP); Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 360 days.

(21) Appl. No.: 11/783,632

(22) Filed: Apr. 11, 2007

(65) Prior Publication Data

US 2007/0236953 A1 Oct. 11, 2007

(30) Foreign Application Priority Data

Apr. 11, 2006 (JP) ............................. 2006-109060

(51) Int. Cl.
*F21V 29/00* (2006.01)
(52) U.S. Cl. ...................... 362/544; 362/543; 362/517; 362/507; 362/538; 362/516
(58) Field of Classification Search .................. 362/544, 362/543, 517, 518, 538, 487, 507, 514, 516
See application file for complete search history.

(56) References Cited

U.S. PATENT DOCUMENTS

| 4,249,232 | A | * | 2/1981 | Dick .......................... 362/547 |
| 6,210,024 | B1 | | 4/2001 | Shida |
| 7,201,506 | B2 | | 4/2007 | Ishida |
| 2003/0198060 | A1 | * | 10/2003 | Ishida et al. ................. 362/516 |
| 2005/0068787 | A1 | * | 3/2005 | Ishida ......................... 362/538 |
| 2005/0259431 | A1 | | 11/2005 | Iwasaki |

FOREIGN PATENT DOCUMENTS

| CN | 1614300 A | 5/2005 |
| DE | 195 26 023 A1 | 1/1997 |
| DE | 102004025699 A1 | 1/2005 |
| DE | 10 2004 009 790 A1 | 9/2005 |
| JP | 11-111010 A | 4/1999 |
| JP | 3187755 B2 | 5/2001 |
| KR | 10-0210299 B1 | 7/1999 |

OTHER PUBLICATIONS

Korean Office Action dated Feb. 22, 2008.
German Office Action dated Mar. 14, 2008.
Chinese Office Action dated Sep. 19, 2008.

* cited by examiner

*Primary Examiner*—Jong-Suk (James) Lee
*Assistant Examiner*—Mark Tsidulko
(74) *Attorney, Agent, or Firm*—Sughrue Mion, PLLC

(57) ABSTRACT

A vehicle lamp is provided with a first unit having a first main reflector for reflecting light from a first semiconductor light emitting element to a front side, and a second unit having a second main reflector for reflecting light from a second semiconductor light emitting element to the front side. A light emitting region of the first unit and a light emitting region of the second unit are arranged to be separated from each other. An additional optical unit for receiving light irradiated from the first and the second units to irradiate to the front side is arranged between the first unit and the second unit such that a light emitting region of the additional optical unit connects the light emitting region of the first unit and the light emitting region of the second unit to be optically recognized as a single light emitting region as a whole.

16 Claims, 9 Drawing Sheets

RECOGNIZED AS A SINGLE EMITTING AREA

RECOGNIZED AS RESPECTIVE EMITTING AREAS

VEHICLE LAMP

This application claims foreign priority from Japanese Patent Application No. 2006-109060, filed on Apr. 11, 2006, the entire contents of which are hereby incorporated by reference.

BACKGROUND OF THE INVENTION

1. Field of the Invention

The present invention relates to a vehicle lamp, particularly relates to a vehicle lamp for forming a predetermined light distribution pattern by overlapping light emitted from a plurality of light source units.

2. Related Art

In a vehicle lamp, there is a case in which from a view point of safety, it is necessary to form a light distribution pattern with high accuracy. The light distribution pattern is formed by an optical system using, for example, a reflecting mirror or a lens or the like.

Further, there is also proposed a vehicle lamp for forming a predetermined light distribution pattern by overlapping light emitted from a plurality of light source units (refer to, for example, JP-B2-3187755).

According to the conventional vehicle lamp shown in FIG. 8 and FIG. 9, a front face opening portion of a lamp body 210 in a shape of a vertically long vessel opened from a front side in a skewed side direction is integrated with a transparent front face cover 211 a side face side of which is bent to a rear side to form a lamp chamber bent from a front face side in a side direction. Inside of the lamp chamber is aligned with a reflecting type lamp unit 220 for forming a high beam and a low beam, and a projecting type fog lamp unit 240 in an up and down direction.

The lamp unit 220 is constituted by a synthetic resin made reflector 222 in a shape of a paraboloid subjected to an aluminum vapor deposition process, and a bulb 230 constituting a light source insertingly attached to be fixed to a bulb inserting hole 223 formed at a rear top portion of the reflector 222.

The bulb 230 is constituted by a structure of integrating a bulb main body 236 integrally containing a filament 236a for a high beam and a filament 236b for a low beam to a bulb socket 232 made of a synthetic resin.

The lamp unit 240 is constituted by a reflector 242 substantially in a shape of an ellipsoid made by aluminum diecast subjected to an aluminum vapor deposition process having an aperture smaller than that of the reflector 222 of the lamp unit 220, a bulb 250 constituting a light source inserted to be attached to a bulb inserting hole 243 of the reflector 242, and a projecting convex lens 248 in a circular shape in a front view integrated to a front face opening portion of the reflector 242 by way of a circular cylinder type lens holder 246 made by aluminum diecast.

The bulb 250 is constituted by a structure of integrating a bulb main body 256 containing a filament 256a to a bulb socket 252 made of a synthetic resin.

An extension reflector 218 provided from the front face opening portion of the lamp body 210 along an inner side of the front face cover 211 is formed with circular opening portions 218a, 218b respectively in correspondence with the reflector 222 of the lamp unit 220 and the projecting convex lens 248 of the lamp unit 240. A surface side of the extension reflector 218 is subjected to an aluminum vapor deposition process similar to that of the reflectors 222, 242 to operate to conceal peripheral edge portions of the lamp units 220, 240 and make an outlook of the head lamp excellent by showing a total of the lamp chamber by a single mirror face color.

However, according to the vehicle lamp described in JP-B2-3187755, there is a portion B (portion surrounded by two-dotted chain line in FIG. 8) which does not constitute illumination between the lamp units 220, 240 and therefore, a walker or the like recognizes the lamp units 220, 240 as individually separated light emitting portions.

Therefore, according to the vehicle lamp forming a predetermined light distribution pattern by overlapping light emitted from the lamp units 220, 240 constituting the plurality of light source units, there is a possibility of deteriorating an optical recognizability as a total of the lamp piece.

SUMMARY OF THE INVENTION

One or more embodiments of the invention provide a vehicle lamp capable of promoting an optical recognizability as a total of a lamp piece for promoting safety while using a plurality of lamp piece units.

In accordance with one or more embodiments of the invention, a vehicle lamp is provided with: a first unit including a first light source and a first main reflector for reflecting light from the first light source to a front side; a second unit including a second light source and a second main reflector for reflecting light from the second light source to the front side, wherein a light emitting region of the first unit and a light emitting region of the second unit are arranged to be separated from each other; and an additional optical unit for receiving light irradiated from at least one of the first unit and the second unit to irradiate to a front side and provided between the first unit and the second unit. In the vehicle lamp, the additional optical unit is arranged such that a light emitting region of the additional optical unit connects the light emitting region of the first unit and the light emitting region of the second unit to be optically recognized as a single light emitting region as a whole.

According to the vehicle lamp having the above-described constitution, by providing the additional optical unit between the first unit and the second unit, the light emitting region of the first unit and the light emitting region of the second unit separated from each other are optically recognized as a single light emitting region as a whole by the light emitting region of the additional optical unit.

That is, walker or the like recognizes the plurality of light source units as a single light emitting portion, and therefore, an optical recognizability of a total of the lamp piece is promoted and safety is promoted.

Further, in the vehicle lamp having the above-described constitution, the first light source of the first unit and the second light source of the second unit may be respectively constituted by a first semiconductor light emitting element and a second semiconductor light emitting element.

According to the vehicle lamp having such a constitution, by constituting a light source of a vehicle lamp by a semiconductor light emitting element of a light emitting diode (LED) which is generally small-sized and having a small power consumption, a limited power can effectively be utilized.

Further, in the vehicle lamp having the above-described constitution, the first unit and the second unit may be arranged such that an attaching face of the first semiconductor light emitting element and an attaching face of the second semiconductor light emitting element are opposed to each other.

According to the vehicle lamp having such a constitution, a constant space is needed for installing a board or the like, by making the side of the attaching face of the first semiconductor light emitting element and the side of the attaching face of the second semiconductor light emitting element which are not made to emit light normally opposed to each other and making the space portion emit light by the additional optical unit, the first unit and the second unit can efficiently be arranged.

Further, according to the vehicle lamp having the above-described constitution, irradiating axes of the first semiconductor light emitting element and the second semiconductor light emitting element may be arranged to be substantially orthogonal to irradiating directions of the first unit and the second unit. In the vehicle lamp, a second additional reflector for reflecting light from the first semiconductor light emitting element to the additional optical unit may be provided on a side of the irradiating axis of the first semiconductor light emitting element. In the vehicle lamp, a third additional reflector for reflecting light from the second semiconductor light emitting element to the additional optical unit may be provided on a side of the irradiating axis of the second semiconductor light emitting element.

According to the vehicle lamp having such a constitution, light from the first semiconductor light emitting element and the second semiconductor light emitting element can be irradiated to the single additional optical unit.

Hence, the constitution of the additional optical unit can be simplified and the additional optical unit can be made to be easy to emit light uniformly.

Further, according to the vehicle lamp having the above-described constitution, the additional optical unit may include a fourth additional reflector for reflecting light reflected by the second additional reflector to irradiate to the front side, and a fifth additional reflector for reflecting light reflected by the third additional reflector to irradiate to the front side.

According to the vehicle lamp having such a constitution, it can also be constituted that, for example, light from the fourth additional reflector is directed to an upper side to ensure irradiating light for illuminating an overhead sign (overhead sign irradiating light), and a degree of freedom of design of a light distribution pattern can be promoted.

Further, the additional optical unit can be constituted by the additional reflector for receiving light irradiated from at least one of the first unit and the second unit to irradiate to a front side, or the additional reflector and a light waveguide or the like arranged on a front side thereof.

According to the vehicle lamp according to one or more embodiments of the invention, by providing the additional optical unit between the first unit and the second unit, the light emitting region of the first unit and the light emitting region of the second unit which are separated from each other can optically be recognized as the single light emitting region as a whole by the light emitting region of the additional optical unit, and therefore, a walker or the like can recognize the plurality of light source units as the single light emitting portion.

Therefore, the vehicle lamp capable of promoting the optical recognizability as a total of the lamp piece and promoting the safety can be provided while using the plurality of light source units.

Other aspects and advantages of the invention will be apparent from the following description and the appended claims.

BRIEF DESCRIPTION OF THE DRAWINGS

FIG. 4(a) shows a case of providing an additional optical unit, FIG. 4(b) shows a case of not providing the additional optical unit.

DETAILED DESCRIPTION OF THE EXEMPLARY EMBODIMENTS

A detailed explanation will be given of exemplary embodiments of a vehicle lamp according to the invention in reference to the drawings as follows.

Figure 1:
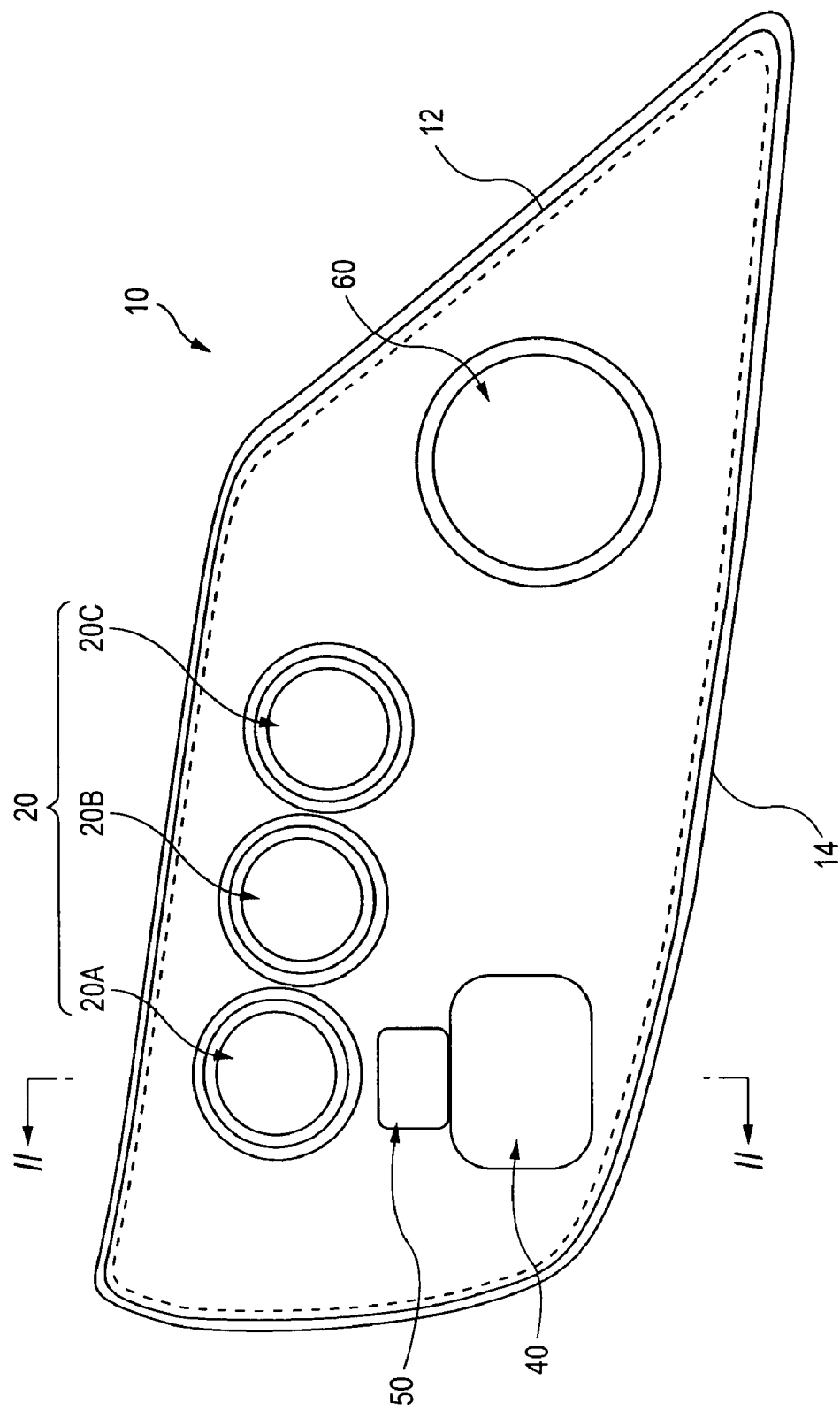
FIG. 1 is a front view showing a vehicle lamp according to a first exemplary embodiment of the invention.
Figure 2:
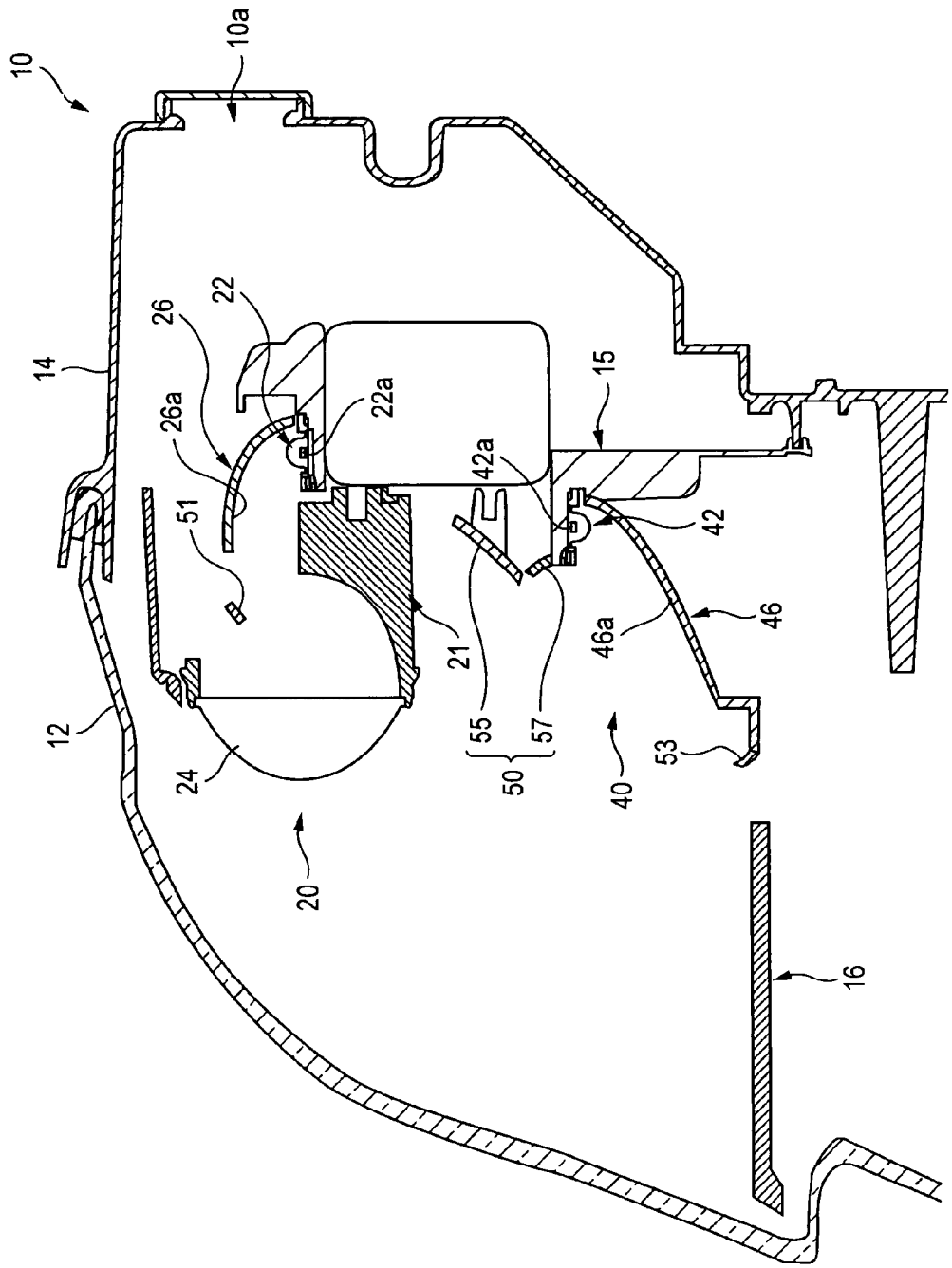
FIG. 2 is a sectional view taken along a line II-II of the vehicle lamp shown in FIG. 1.
Figure 3:
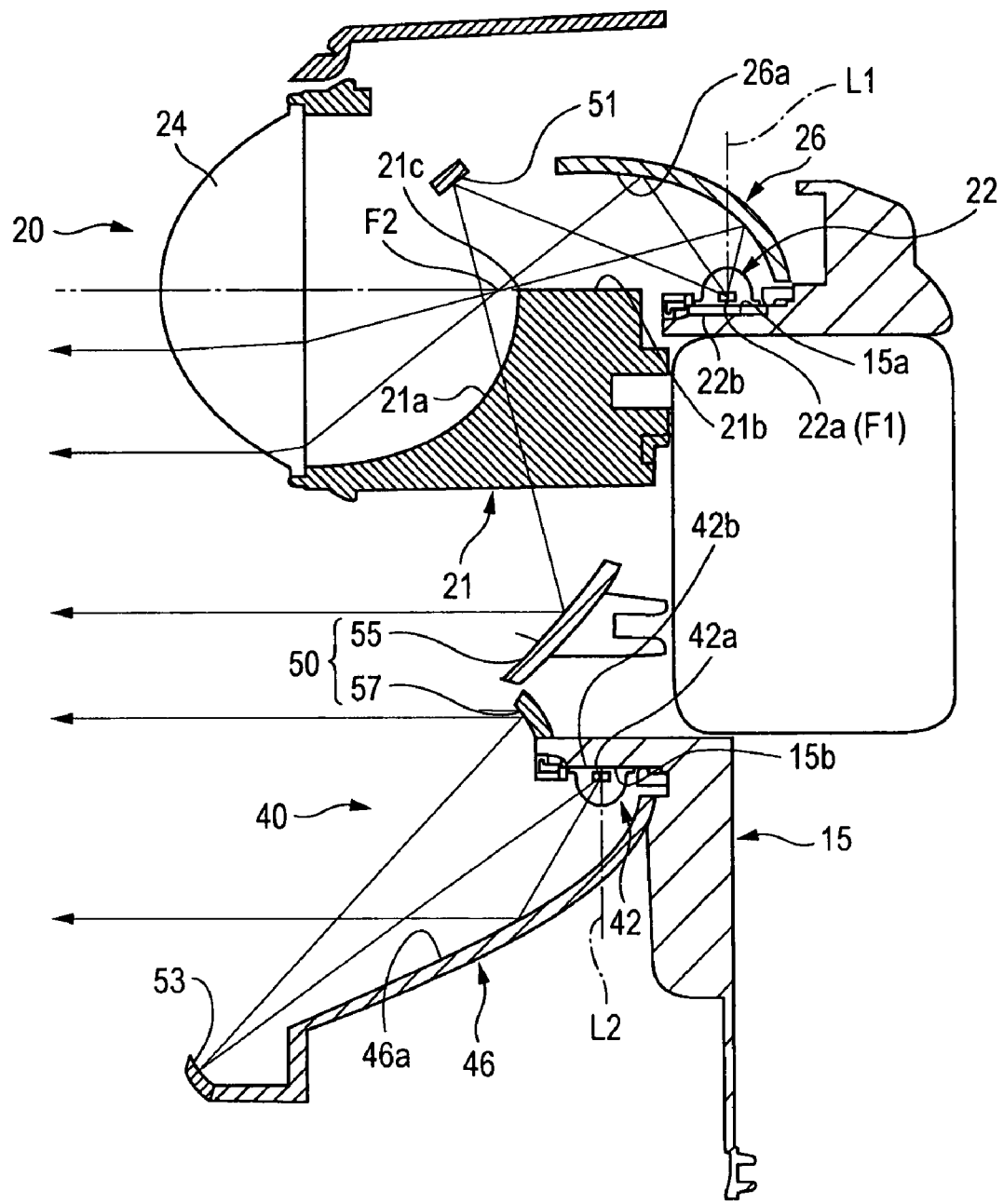
FIG. 3 is a view enlarging an essential portion of the vehicle lamp shown in FIG. 2.
Figure 4:
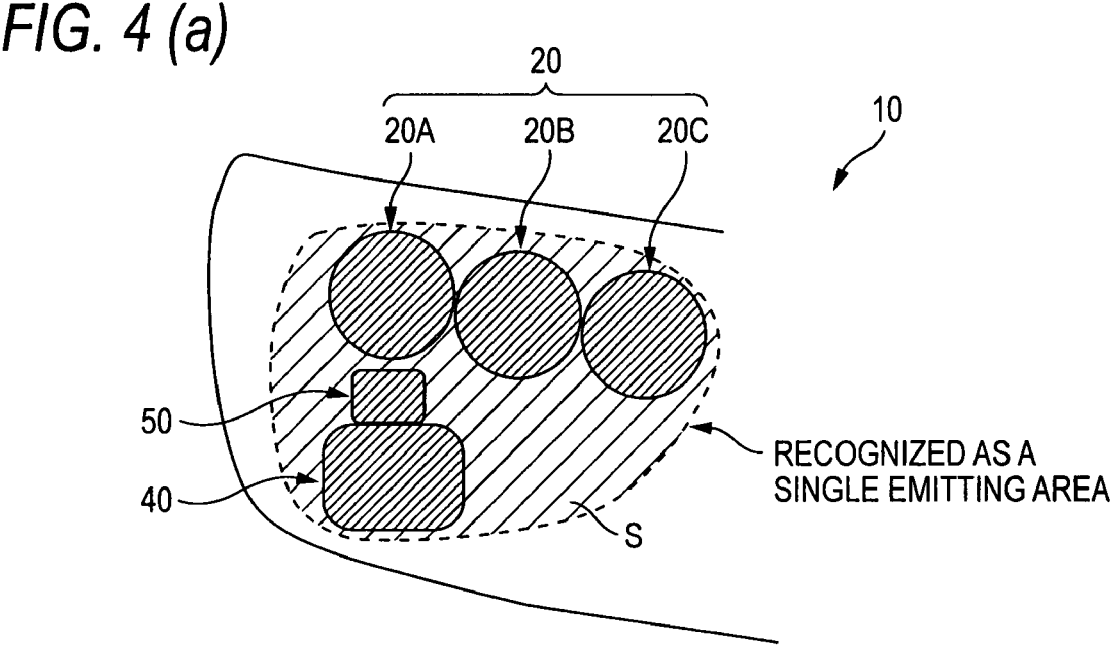
FIGS. 4(a) and 4(b) illustrate explanatory views for explaining an optical recognizability of a vehicle lamp.
Figure 4:
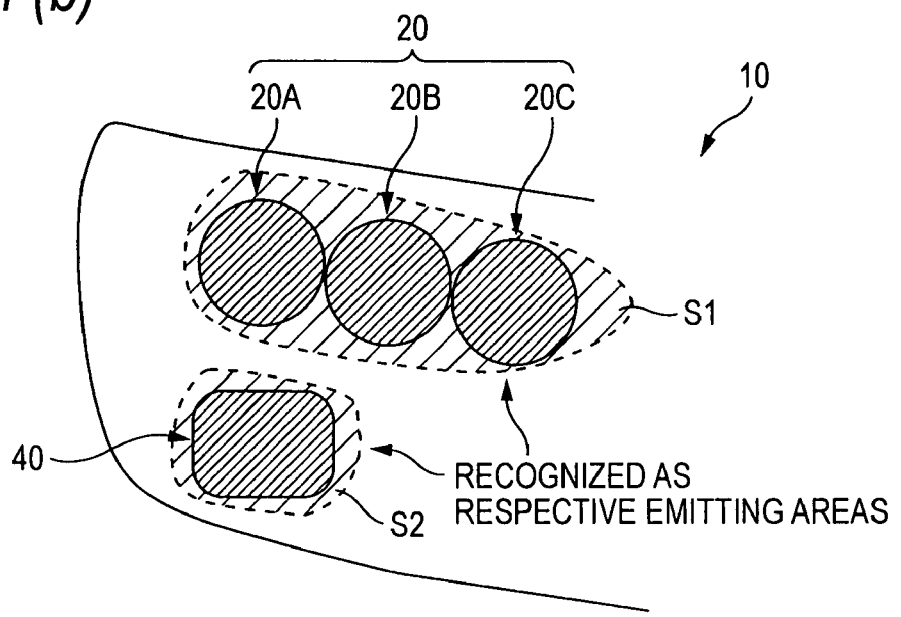

FIG. 1 is a front view showing a vehicle lamp according to a first exemplary embodiment of the invention, FIG. 2 is a sectional view taking along a line II-II of the vehicle lamp shown in FIG. 1, FIG. 3 is a view enlarging an essential portion of the vehicle lamp shown in FIG. 2, FIGS. 4(a) and 4(b) illustrate explanatory views for explaining an optical recognizability of the vehicle lamp, FIG. 4(a) shows a case of providing an additional optical unit, and FIG. 4(b) shows a case of not providing the additional optical unit.

A vehicle lamp 10 according to the first exemplary embodiment is a headlamp attached to, for example, a front end portion of a vehicle and capable of selectively switching a high beam and a low beam to switch on and off. In FIG. 1, a headlamp unit (headlamp unit) attached to a right front side of a vehicle of an automobile or the like is shown as the vehicle lamp 10 as an example.

As shown by FIG. 1 and FIG. 2, the vehicle lamp 10 is provided with a light transmitting cover 12 having a light transmitting performance and a lamp body (lamp member) 14. Further, at inside of a lamp chamber 10a surrounded by the light transmitting cover 12 and the lamp body 14, three light source units (first unit 20, second unit 40, third unit 60) are fixedly arranged above a support member 15. Further, an extension 16 is arranged between the three light source units 20, 40, 60 and the light transmitting cover 12 to cover a gap when viewed from a front side of the lamp piece.

The support member 15 includes a support face 15a attached with an attaching face 22b of a first semiconductor light emitting element (LED) 22 constituting a first light source of the first unit 20, and a support face 15b attached with an attaching face 42b attached with an attaching face 42b of a second semiconductor light emitting element (LED) 42 constituting a second light source of the second unit 40, and is fixed to the lamp body 14. The support member 15 is fixed to the lamp body 14 by way of a leveling mechanism, not illustrated, and can adjust optical axes of the respective light source units.

Next, the respective light source units 20, 40, 60 will be explained.

The vehicle lamp 10 of the first exemplary embodiment is constituted to form a light distribution pattern of a low beam by overlapping light emitted from the first unit 20 and the second unit 40 and form a light distribution pattern of a high beam by light emitted from the third unit 60.

In the following, first, the first unit 20 will be explained.

The first unit 20 is a light source unit forming the light distribution pattern of the low beam along with the second unit 40 mentioned later, and installed with 3 pieces of sub units 20A, 20B, 20C respectively having a same constitution to be aligned in a width direction of an upper installing portion of the support member 15.

As shown by FIG. 2 and FIG. 3, the subunit 20A (substantially similar to sub units 20B, 20C) includes the first semiconductor light emitting element 22 constituting the first light source fixedly arranged at the support face 15a of the support member 15, a first main reflector 26 for reflecting light from the first semiconductor light emitting element 22 to a front side, a base member 21 arranged on a front side of the support member 15, and a projecting lens 24 held by the base member 21.

The first semiconductor light emitting element 22 is a white light emitting diode having the light emitting portion (light emitting chip) 22a of a size of about 1 mm square, and is mounted on the support face 15a of the support member 15 in a state of directing an irradiating axis L1 substantially in an vertical upper direction substantially orthogonal to an irradiating direction (left direction in FIG. 3) of the sub unit 20A. Further, the light emitting portion 22a may be constituted to be arranged by attaching more or less angle in accordance with a shape of the light emitting portion or a distribution of light irradiated to the front side. Further, a plurality of light emitting portions (light emitting chips) may be provided in one semiconductor light emitting element.

The first main reflector 26 is a reflecting member an inner side of which is formed with a reflecting face 26a having a vertical sectional shape substantially in an elliptical shape and a horizontal sectional shape in a free curved shape constituting a base there of by an ellipse. The first main reflector 26 is designed to be arranged such that a first focal point F1 constitutes a vicinity of the light emitting portion 22a of the first semiconductor light emitting element 22, and a second focal point F2 is disposed at a vicinity of a ridge line 21c constituted by a bent face 21a and a horizontal face 21b of the base member 21.

Light emitted from the light emitting portion 22a of the first semiconductor light emitting element 22 is reflected by the reflecting face 26a of the first main reflector 26 and is incident on the projecting lens 24 by passing a vicinity of the second focal point F2. Further, the sub unit 20A (sub units 20B, 20C) is constituted to form a skewed cutoff line to a light distribution pattern projected to the front side of the vehicle by selectively cutting light by reflecting a portion of light on the horizontal face 21b by constituting a boundary line by the ridge line 21c of the base member 21. That is, the ridge line 21c constitutes a bright/dark boundary line of the sub unit 20A (sub units 20B, 20C).

Further, it is preferable that also a portion of light reflected by the reflecting face 26a of the first main reflector 26 and further reflected by the horizontal face 21b of the base member 21 is irradiated to the front side as effective light. Therefore, according to the first exemplary embodiment, the front side of the vehicle of the horizontal face 21b of the base member 21 is provided with an optical shape in which an angle of reflection is set pertinently in consideration of a positional relationship between the projecting lens 24 and the first main reflector 26.

The projecting lens 24 is an aspherical lens of a convex lens type for projecting light reflected by the reflecting face 26a of the first main reflector 26 to the front side of the vehicle, and is fixed to a vicinity of a front end portion on the front side of the vehicle of the base member 21. According to the first exemplary embodiment, a rear side focal point of the projecting lens 24 is constituted to substantially coincide with the second focal point F2 of the first main reflector 26.

Therefore, light reflected by the first main reflector 26 and incident on the projecting lens 24 is projected to the front side substantially as parallel light. That is, the sub units 20A, 20B, 20C of the first unit 20 of the first exemplary embodiment respectively constitute projector type light sources of a reflecting type for forming a condensed light cut.

Next, the second unit 40 will be explained.

The second unit 40 is a light source unit for forming a light distribution pattern of a low beam along with the first unit 20, and is arranged on a lower side of the sub unit 20A.

As shown by FIG. 2 and FIG. 3, the second unit 40 includes the second semiconductor light emitting element 42 constituting the second light source fixedly arranged at the support face 15b of the support member 15, and a second main reflector 46 for reflecting light from the second semiconductor light emitting element 42 to the front side.

The second semiconductor light emitting element 42 is a white diode having a light emitting portion 42a similar to the first light emitting portion 22, and is mounted on the support face 15b of the support member 15 in a state of directing an irradiating axis L2 substantially in a vertical lower direction substantially orthogonal to an irradiating direction (left direction of FIG. 3) of the second unit 40.

The second main reflector 46 is a reflecting member an inner side of which is formed with a reflecting face 46a constituting a reference face thereof by substantially a paraboloid of revolution constituting a focal point by a vicinity of the light emitting portion 42a. Light emitted from the light emitting portion 42a of the second semiconductor light emitting element 42 is reflected by the reflecting face 46a of the second main reflector 46 and is irradiated to the front side of the vehicle. That is, the second unit 40 of the first exemplary embodiment constitutes a light source unit of a reflecting type.

Next, the third unit 60 is a light source unit for forming a light distribution pattern of a high beam and includes a third semiconductor light emitting element (not illustrated) constituting a third light source fixedly arranged to the support member 15, and a projecting lens 64.

The projecting lens 64 is an aspherical lens of a convex lens type for projecting light emitted from a light emitting portion of the third semiconductor light emitting element to the front side of the vehicle and is constituted such that a rear side focal point of the projecting lens 64 substantially coincides with the light emitting portion of the third semiconductor light emitting element (refer to FIG. 1). Therefore, light emitted from the light emitting portion of the third semiconductor light emitting element is directly incident on the projecting lens 64, and the incident light is projected to the front side along an optical axis as substantially parallel light. That is, the third unit 60 of the first exemplary embodiment constitutes a projector type light source unit of a straight projecting type.

Further, according to the first exemplary embodiment, as shown by FIG. 2 and FIG. 3, the attaching face 22b of the first semiconductor light emitting element 22 and the attaching face 42b of the second semiconductor light emitting element 42 are arranged to be opposed to each other, and an additional optical unit 50 is provided between the first unit 20 and the second unit 40 the light emitting regions of which are arranged to be separated from each other in an up and down direction.

According to the additional optical unit 50, as shown by FIG. 4(a), a light emitting region of the additional optical unit 50 is arranged to be optically recognized as a single light emitting region S as a whole by connecting a light emitting region S1 of the first unit 20 and a light emitting region S2 of the second unit 40.

Further, a side of the irradiating axis L1 of the first semiconductor light emitting element 22 is provided with a second additional reflector 51 for reflecting light from the light source 22a of the first semiconductor light emitting element 22 to the additional optical unit 50, and a side of the irradiating axis L2 of the second semiconductor light emitting element 42 is provided with a third additional reflector 53 for reflecting light from the light source 42a of the second semiconductor light emitting element 42 to the additional optical unit 50.

Further, the additional optical unit 50 includes a fourth additional reflector 55 for reflecting light reflected by the second additional reflector 51 to irradiate to front side, and a fifth additional reflector 57 for reflecting light reflected by the third additional reflector 53 to irradiate to the front side.

Hence, the second additional reflector 51 is arranged on a front side of a front end portion of an upper side of the first main reflector 26 for reflecting light from the light source 22a of the first semiconductor light emitting element 22 to the fourth additional reflector 55. Further, the third additional reflector 53 is arranged at a front end portion of a lower side of the second main reflector 46 for reflecting light from the light source 42a of the second semiconductor light emitting element 42 to the fifth additional reflector 57.

A reflecting face of the fourth additional reflector 55 of the embodiment is formed by substantially an elliptical system at a vertical section thereof and substantially by a parabolic system at a horizontal section thereof for constituting diffusing light by light irradiated to the front side of the vehicle and is constituted such that irradiating light for illuminating an overhead sign (overhead sign irradiating light) can be ensured by directing light from the fourth additional reflector 55 to the upper side.

According to the vehicle lamp 10 of the first exemplary embodiment, as shown by FIG. 4(a), by providing the additional optical unit 50 between the first unit 20 and the second unit 40, the light emitting region S1 of the first unit 20 and the light emitting region S2 of the second unit 40 which are separated from each other are optically recognized as the single light emitting region S as a whole by the light emitting region of the additional optical unit 50. That is, as shown by FIG. 4(b), when the additional optical unit 50 is not provided between the first unit 20 and the second unit 40, a walker or the like recognizes the light emitting region S1 of the first unit 20 and the light emitting region S2 of the second unit 40 as individually separated light emitting portions.

Therefore, according to the vehicle lamp 10 of the first exemplary embodiment, a walker or the like can recognize the first unit 20 and the second unit 40 constituting the plurality of light source units as a single light emitting portion, and therefore, an optical recognizability of a total of the lamp piece is promoted and safety is promoted.

Further, according to the vehicle lamp 10 of the first exemplary embodiment, the first light source of the first unit 20 and the second light source of the second unit 40 are respectively constituted by the first semiconductor light emitting element 22 and the second semiconductor light emitting element 42.

Hence, by constituting the light sources of the vehicle lamp 10 by the semiconductor light emitting elements 22, 42 such as light emitting diodes (LED) which are generally small-sized and having small power consumption.

Naturally, as the first light source, the second light source and the third light source of the vehicle lamp according to the invention, discharge bulbs, halogen bulbs or the like of metal halide bulbs or the like constituting light sources by discharge light emitting portions can naturally be used.

Further, according to the first unit 20 and the second unit 40 of the first exemplary embodiment, the attaching face 22b of the first semiconductor light emitting element 22 and the attaching face 42b of the second semiconductor light emitting element 42 are arranged to be opposed to each other.

Hence, by making a side of the attaching face 22b of the first semiconductor light emitting element 22 and a side of the attaching face 42b of the second semiconductor light emitting element 42 which need constant spaces for installing boards or the like and do not emit light normally opposed to each other and making the space portion emit light by the additional optical unit 50, the first unit 20 and the second unit 40 can efficiently be arranged.

Further, the additional optical unit 50 of the vehicle lamp 10 of the first exemplary embodiment includes the fourth additional reflector 55 for reflecting light reflected by the second additional reflector 51 to irradiate to the front side and the fifth additional reflector 57 for reflecting light reflected by the third additional reflector 53 to irradiate to the front side.

Hence, there can be constructed a constitution in which light from the fourth additional reflector 55 is directed to the upper side and irradiating light for illuminating an overhead sign (overhead sign irradiating light) is ensured as described above, and a degree of freedom of design of the light distribution pattern can be promoted.

Further, the constitutions of the first, the second units and the additional optical unit and the like in the vehicle lamp of the invention are not limited to the constitutions of the above-described embodiment but can naturally adopt various modes based on the gist of the invention.

Figure 5:
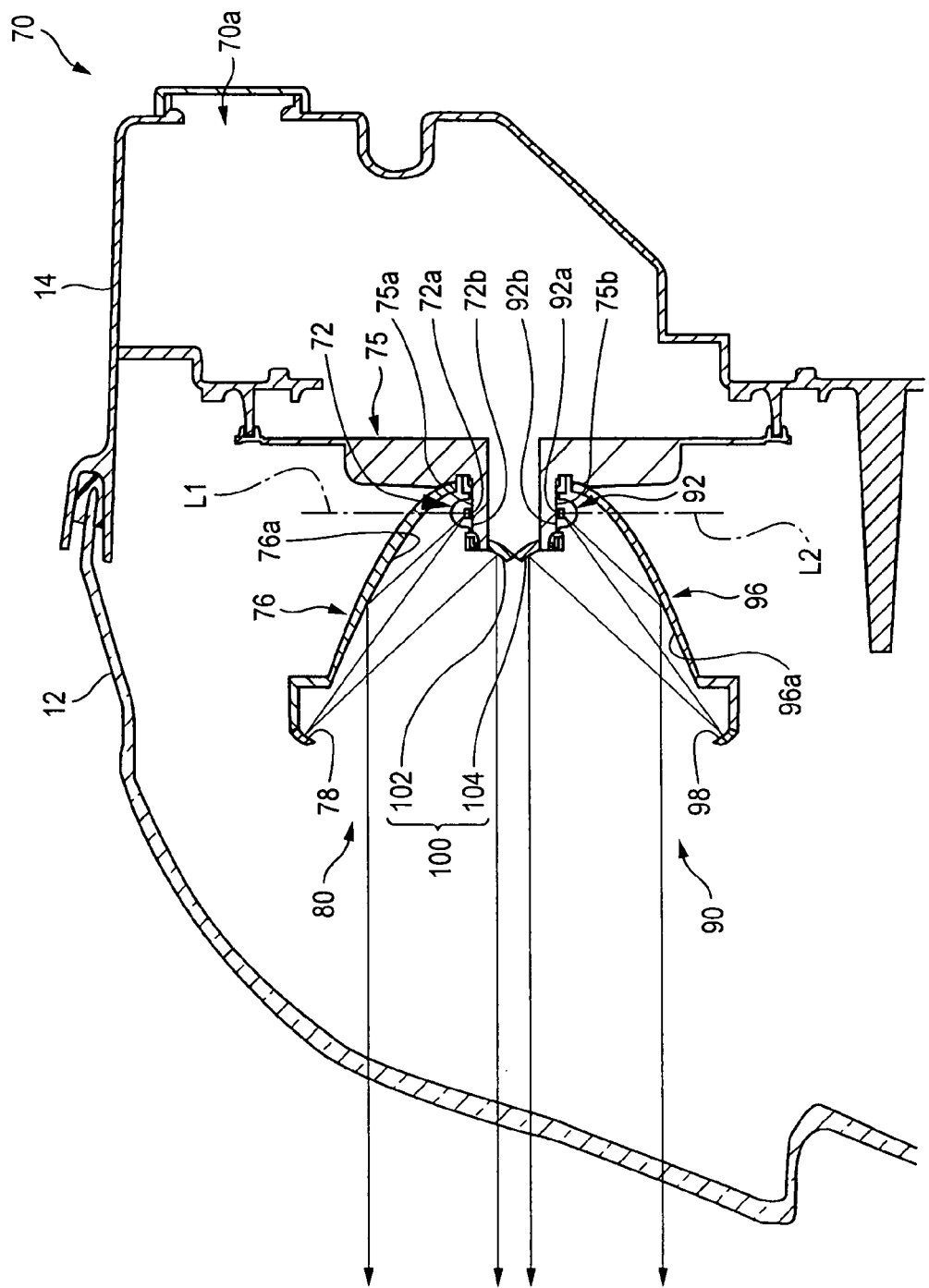
FIG. 5 is a vertical sectional view of a vehicle lamp according to a second exemplary embodiment of the invention.

FIG. 5 is a vertical sectional view of a vehicle lamp according to a second exemplary embodiment of the invention. Further, constituent members substantially similar to those of the vehicle lamp 10 of the first exemplary embodiment are attached with the same notations and a detailed explanation thereof will be omitted.

According to a vehicle lamp 70 of the second exemplary embodiment, as shown by FIG. 5, inside of a lamp chamber 70a surrounded by the light transmitting cover 12 and the lamp body 14 is fixedly arranged with the first unit 80 and a second unit 90 on a support member 75.

The support member 75 includes a support face 75a attached with an attaching face 72b of a first semiconductor light emitting element (LED) 72 constituting a first light source of the first unit 80, and a support face 75b attached with an attaching face 92b of a second semiconductor light emitting element (LED) 92 constituting a second light source of the second unit 90. The support member 75 is fixed to the lamp body 14 by way of a leveling mechanism, not illustrated, and can adjust optical axes of the respective light source units.

The vehicle lamp 70 of the second exemplary embodiment is constituted to form a light distribution pattern of a high beam by overlapping light emitted from the first unit 80 and the second unit 90.

The first unit 80 includes the first semiconductor light emitting element 72 constituting the first light source fixedly arranged at the support face 75a of the support member 75 and a first main reflector 76 for reflecting light from the first semiconductor light emitting element 72 to the front side.

The first semiconductor light emitting element 72 is a white diode having a light emitting portion 72a and is mounted on the support face 75a of the support member 75 in a state in which an irradiating axis L1 is directed substantially in a vertical upper direction substantially orthogonal to an irradiating direction (left direction of FIG. 5) of the first unit 80.

The first main reflector 76 is a reflecting member an inner side of which is formed with a reflecting face 76a constituting a reference face substantially by a paraboloid of revolution constituting a focal point by a vicinity of the light emitting portion 72a. Light emitted from the light emitting portion 72a of the first semiconductor light emitting element 72 is reflected by the reflecting face 76a of the first main reflector 76 to be irradiated to the front side of the vehicle. That is, the first unit 80 of the second exemplary embodiment constitutes a light source unit of a reflecting type.

On the other hand, the second unit 90 is a light source unit forming a light distribution pattern of a high beam along with the first unit 80 and is arranged on a lower side of the first unit 80.

As shown by FIG. 5, the second unit 90 includes the second semiconductor light emitting element 92 as the second light source fixedly arranged to the support face 75b of the support member 75, and a second main reflector 96 for reflecting light from the second semiconductor light emitting element 92 to the front side.

The second semiconductor light emitting element 92 is a white diode having a light emitting portion 92a similar to the first semiconductor light emitting element 72 and is mounted on the support face 75b of the support member 75 in a state in which an irradiating axis L2 is directed substantially in a vertical lower direction substantially orthogonal to an irradiating direction (left direction of FIG. 5) of the second unit 90.

The second main reflector 96 is a reflecting member an inner side of which is formed with a reflecting face 96a constituting a reference face substantially by a paraboloid of revolution constituting a focal point by a vicinity of the light emitting portion 92a. Light emitted from the light emitting portion 92a of the second semiconductor light emitting element 92 is reflected by the reflecting face 96a of the second main reflector 96 to be irradiated to the front side of the vehicle. That is, the second unit 90 of the embodiment constitutes a light source unit of a reflecting type.

Further, according to the second exemplary embodiment, as shown by FIG. 5, the attaching face 72b of the first semiconductor light emitting element 72 and the attaching face 92b of the second semiconductor light emitting element 92 are arranged to be opposed to each other, and an additional optical unit 100 is provided between the first unit 80 and the second unit 90 light emitting regions of which are arranged to be separated from each other in an up and down direction.

The additional optical unit 100 is arranged such that a light emitting region of the additional optical unit 100 connects a light emitting region of the first unit 80 and a light emitting region of the second unit 90 to be optically recognized as a single light emitting region as a whole.

Further, a side of the irradiating axis L1 of the first semiconductor light emitting element 72 is provided with a second additional reflector 78 for reflecting light from the light source 72a of the first semiconductor light emitting element 72 to the additional optical unit 100, and a side of the irradiating axis L2 of the second semiconductor light emitting element 92 is provided with a third additional reflector 98 for reflecting light from the light source 92a of the second semiconductor light emitting element 92 to the additional optical unit 100.

Further, the additional optical unit 100 includes a fourth additional reflector 102 for reflecting light reflected by the second additional reflector 78 to irradiate to the front side, and a fifth additional reflector 104 for reflecting light reflected by the third additional reflector 98 to irradiate to the front side.

Hence, the second additional reflector 78 is arranged on a front side of a front end portion on an upper side of the first main reflector 76 for reflecting light from the light source 72a of the first semiconductor light emitting element 72 to the fourth additional reflector 102. Further, the third additional reflector 98 is arranged at a front end portion on a lower side of the second main reflector 96 for reflecting light from the light source 92a of the second semiconductor light emitting element 92 to the fifth additional reflector 104.

According to the vehicle lamp 70 of the second exemplary embodiment, similar to the vehicle lamp 10 of the first exemplary embodiment, by providing the additional optical unit 100 between the first unit 80 and the second unit 90, the light emitting region of the first unit 80 and the light emitting region of the second unit 40 which are separated from each other are optically recognized as the single light emitting region as a whole by the light emitting region of the additional optical unit 100.

Therefore, according to the vehicle lamp 70 of the second exemplary embodiment, a walker or the like can recognize the first unit 80 and the second unit 90 constituting the plurality of light source units as the single light emitting portion, and therefore, the optical recognizability of the total of the lamp piece is promoted and safety is promoted.

Figure 6:
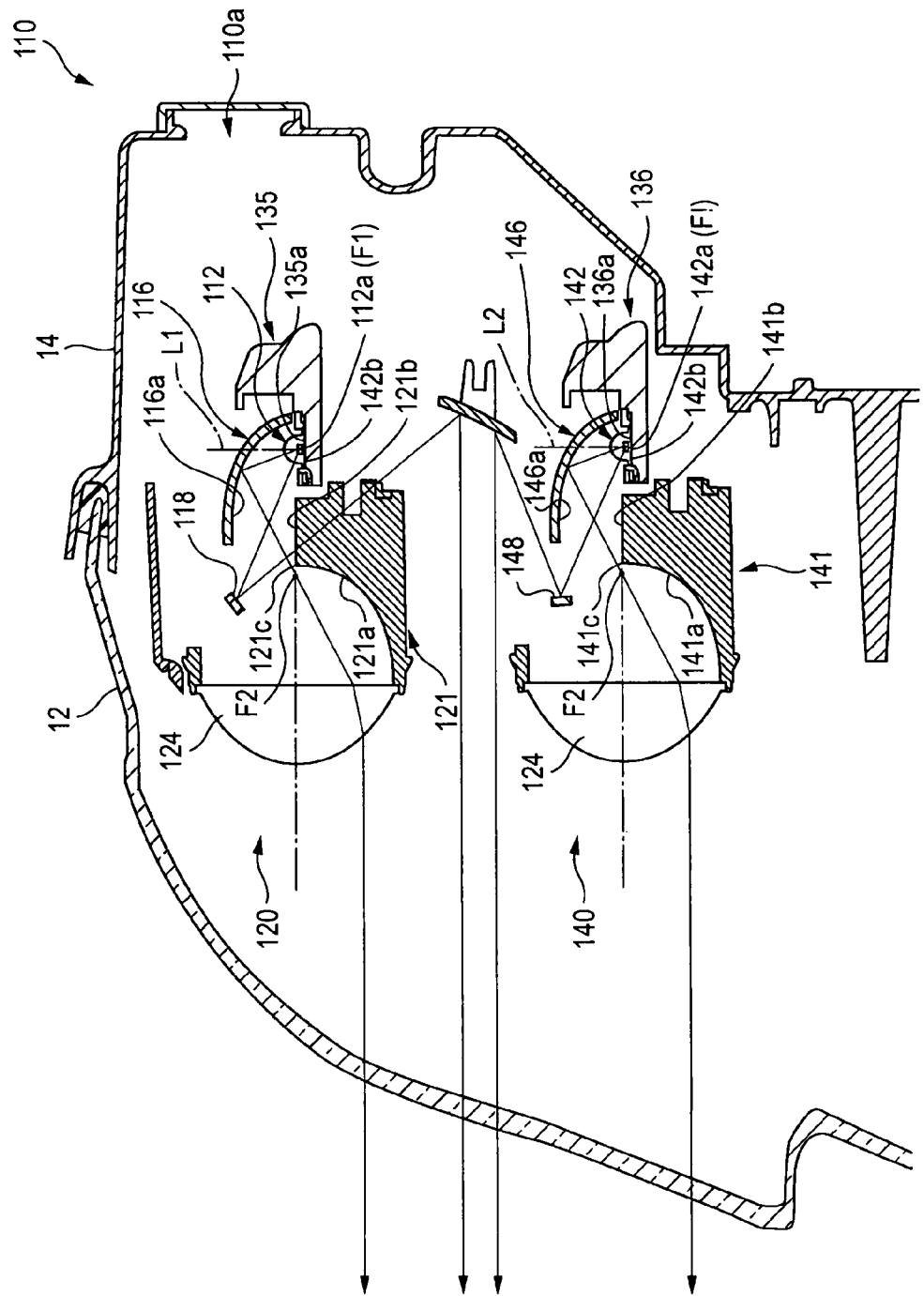
FIG. 6 is a vertical sectional view of a vehicle lamp according to a third exemplary embodiment of the invention.

FIG. 6 is a vertical sectional view of a vehicle lamp according to a third exemplary embodiment of the invention. Further, constituent members substantially similar to those of the vehicle lamp 10 of the first exemplary embodiment are attached with the same notations and a detailed explanation thereof will be omitted.

According to a vehicle lamp 110 of the third exemplary embodiment, as shown by FIG. 6, inside of a lamp chamber 110 surrounded by the light transmitting cover 12 and the lamp body 14 is fixedly arranged with a first unit 120 and a second unit 140 on a support member 135 and a support member 136.

The support member 135 includes a support face 135a attached with an attaching face 112b of a first semiconductor light emitting element (LED) 112 constituting a first light source of the first unit 120 and is fixed to the lamp body 14. The support member 136 includes a support face 136a attached with an attaching face 142b of a second semiconductor light emitting element (LED) 142 constituting a second light source of the second unit 140 and is fixed to the lamp body 14. The support members 135, 136 are fixed to the lamp body 14 by way of a leveling mechanism, not illustrated, and can adjust optical axes of the respective light source units.

The vehicle lamp 110 of the third exemplary embodiment is constituted to form a light distribution pattern of a low beam by overlapping light emitted from the first unit 120 and the second unit 140.

As shown by FIG. 6, the first unit 120 includes the first semiconductor light emitting element 112 constituting the first light source fixedly arranged at the support face 135a of the support member 135, a first main reflector 116 for reflecting light from the first semiconductor light emitting element 112 to the front side, a base member 121 arranged on a front side of the support member 135, and a projecting lens 124 held by the base member 121.

The first semiconductor light emitting element 112 is a white light emitting diode having a light emitting portion (light emitting chip) 112a having a size of about 1 mm square and is mounted on the support face 135a of the support member 135 in a state of directing an irradiating axis S1 substantially in a vertical upper direction substantially orthogonal to an irradiating direction (left direction of FIG. 6) of the first unit 120. Further, the light emitting portion 112a may be constituted to be arranged by attaching more or less angle in accordance with a shape of the light emitting portion or a distribution of light irradiated to the front side.

The first main reflector 116 is a reflecting member an inner side of which is formed with a reflecting face 116a having a vertical sectional shape substantially in an elliptical shape and a horizontal sectional shape in a free curved face shape constituting a base by an ellipse. The first main reflector 116 is designed to be arranged such that a first focal point F1 thereof constitutes a vicinity of the light emitting portion 112a of the first semiconductor light emitting element 112, and a second focal point F2 is disposed at a vicinity of a ridge line 121c constituted by a bent face 121a and a horizontal face 121b of the base member 121.

Light emitted from the light emitting portion 112a of the second semiconductor light emitting element 112 is reflected by the reflecting face 116a of the first main reflector 116 and is incident on the projecting lens 124 by passing a vicinity of the second focal point F2. Further, the first unit 120 is constituted to form a skewed cutoff line to a light distribution pattern projected to the front side of the vehicle by selectively cutting light by reflecting a portion of light by the horizontal face 121b by constituting a boundary line by the ridge line 121c of the base member 121. That is, the ridge line 121c constitutes a bright/dark boundary line of the first unit 120.

Further, it is preferable that also a portion of light reflected by the reflecting face 116a of the first main reflector 116 and further reflected by the horizontal face 121b of the base member 121 is irradiated to the front side as effective light. Therefore, according to the third exemplary embodiment, a front side of the vehicle of the horizontal face 121b of the base member 121 is provided with an optical shape set with an angle with reflectance pertinently in consideration of a positional relationship between the projecting lens 124 and the first main reflector 116.

The projecting lens 124 is an aspherical lens of a convex lens type for projecting light reflected by the reflecting face 116a of the first main reflector 116 to the front side of the vehicle and is fixed at a vicinity of a front end portion on a front side of the vehicle of the base member 121. According to the third exemplary embodiment, a rear side focal point of the projecting lens 124 is constituted to substantially coincide with the second focal point F2 of the first main reflector 116.

Therefore, light reflected by the first main reflector 116 and incident on the projecting lens 124 is projected to the front side as substantially parallel light. That is, the first unit 120 of the third exemplary embodiment constitutes a projector type light source unit of a reflecting type for forming a converged light cut.

On the other hand, as shown by FIG. 6, the second unit 140 includes the second semiconductor light emitting element 142 constituting the second light source fixedly arranged to the support face 136a of the support member 136, a second main reflector 146 for reflecting light from the second semiconductor light emitting element 142 to the front side, a base member 141 arranged on a front side of the support member 136, and a projecting lens 144 held by the base member 141.

The second semiconductor light emitting element 142 is a white light emitting diode having a light emitting portion (light emitting chip) 142a similar to the first semiconductor light emitting element 112 and is mounted on the support face 136a of the support member 136 in a state of directing an irradiating axis L2 substantially in a vertical upper direction substantially orthogonal to an irradiating direction (left direction of FIG. 6) of the second unit 140. Further, the light emitting portion 142a may be constituted to be installed by attaching more or less angle in accordance with a shape of the light emitting portion or a distribution of light irradiated to the front side.

The second main reflector 146 is a reflecting member the inner side of which is formed with a reflecting face 146a having a vertical sectional shape substantially in an elliptical shape, and a horizontal sectional shape in a free curved face shape constituting a base by an ellipse. The second main reflector 146 is designed to be arranged such that a first focal point F1 thereof constitutes a vicinity of the light emitting portion 142a of the second semiconductor light emitting element 142, and a second focal point F2 is disposed to a vicinity of a ridge line 141c constituted by a curved face 141a and a horizontal face 141b of the base member 141.

Light emitted from the light emitting portion 142a of the second semiconductor light emitting element 142 is reflected by the reflecting face 146a of the second main reflector 146 and is incident on the projecting lens 144 by passing a vicinity of the second focal point F2. Further, the second unit 140 is constituted to form a skewed cutoff line to a light distribution pattern projected to the front side of the vehicle by selectively cutting light by reflecting a portion of light by the horizontal face 141b by constituting a boundary line by the ridge line 141c of the base member 141. That is, the ridge line 141c constitutes a bright/dark boundary line of the second unit 140.

Further, it is preferable that also a portion of light reflected by the reflecting face 146a of the second main reflector 146 and further reflected by the horizontal face 141b of the base member 141 is irradiated as effective light. Therefore, according to the third exemplary embodiment, a front side of the vehicle of the horizontal face 141b of the base member 141 is provided with an optical shape set with an angle of reflection pertinently in consideration of a positional relationship between the projecting lens 144 and the second main reflector 146.

The projecting lens 144 is an aspherical lens of a convex lens type for projecting light reflected by the reflecting face 146a of the second main reflector 146 to the front side of the vehicle and is fixed to a vicinity of a front end portion on the front side of the vehicle of the base member 141. According to the third exemplary embodiment, a rear side focal point of the projecting lens 144 is constituted to substantially coincide with the second focal point F2 of the second main reflector 146.

Therefore, light reflected by the second main reflector 146 and incident on the projecting lens 144 is projected to the front side substantially as parallel light. That is, the second unit 140 of the third exemplary embodiment constitutes a projector type light source unit of a reflecting type for forming a condensed light cut.

Further, according to the third exemplary embodiment, as shown by FIG. 6, an additional optical unit 150 is provided between the first unit 120 and the second unit 140 arranged such that the attaching face 112B of the first semiconductor light emitting element 112 and the attaching face 142b of the second semiconductor light emitting element 142 are directed in the same lower direction, and arranged such that the light emitting regions are separated from each other in an up and down direction.

The additional optical unit 150 is arranged such that a light emitting region of the additional optical unit 150 connects a light emitting region of the first unit 120 and a light emitting region of the second unit 140 to be optically recognized as a single light emitting region as a whole.

Further, a side of the irradiating axis L1 of the first semiconductor light emitting element 112 is provided with a second additional reflector 118 for reflecting light from the light source 112a of the first semiconductor light emitting element 112 to the additional optical unit 150, and a side of the irradiating axis L2 of the second semiconductor light emitting element 142 is provided with a third additional reflector 148 for reflecting light from the light source 142a of the second semiconductor light emitting element 142 to the additional optical unit 150.

Further, the additional optical unit 150 includes a sixth additional reflector 151 for reflecting light respectively reflected by the second additional reflector 118 and the third additional reflector 148 to the front side.

Hence, the second additional reflector 118 is arranged on a front side of a front end portion of an upper side of the first main reflector 116 for reflecting light from the light source 112a of the first semiconductor light emitting element 112 to the sixth additional reflector 151. Further, the third additional reflector 148 is arranged on a front side of a front end portion of an upper side of the second main reflector 146 for reflecting light from the light source 142a of the second semiconductor light emitting element 142 to the sixth additional reflector 151.

According to the vehicle lamp 110 of the third exemplary embodiment, similar to the vehicle lamp of the first exemplary embodiment, by providing the additional optical unit 150 between the first unit 120 and the second unit 140, a light emitting region of the first unit 120 and a light emitting region of the second unit 140 which are separated from each other are optically recognized as a single light emitting region as a whole by a light emitting region of the additional optical unit 150.

Further, according to the vehicle lamp 110 of the third exemplary embodiment, light from the first semiconductor light emitting element 112 and the second semiconductor light emitting element 142 can be irradiated to the single sixth additional reflector 151.

Hence, the constitution of the additional optical unit 150 can be simplified and the additional optical unit 150 can be made to be easy to emit light uniformly.

Therefore, according to the vehicle lamp 110 of the third exemplary embodiment, a walker or the like can recognize the first unit 120 and the second unit 140 constituting the plurality of light source units as the single light emitting portion, and therefore, the optical recognizability as a total of the lamp piece is promoted and safety is promoted.

Figure 7:
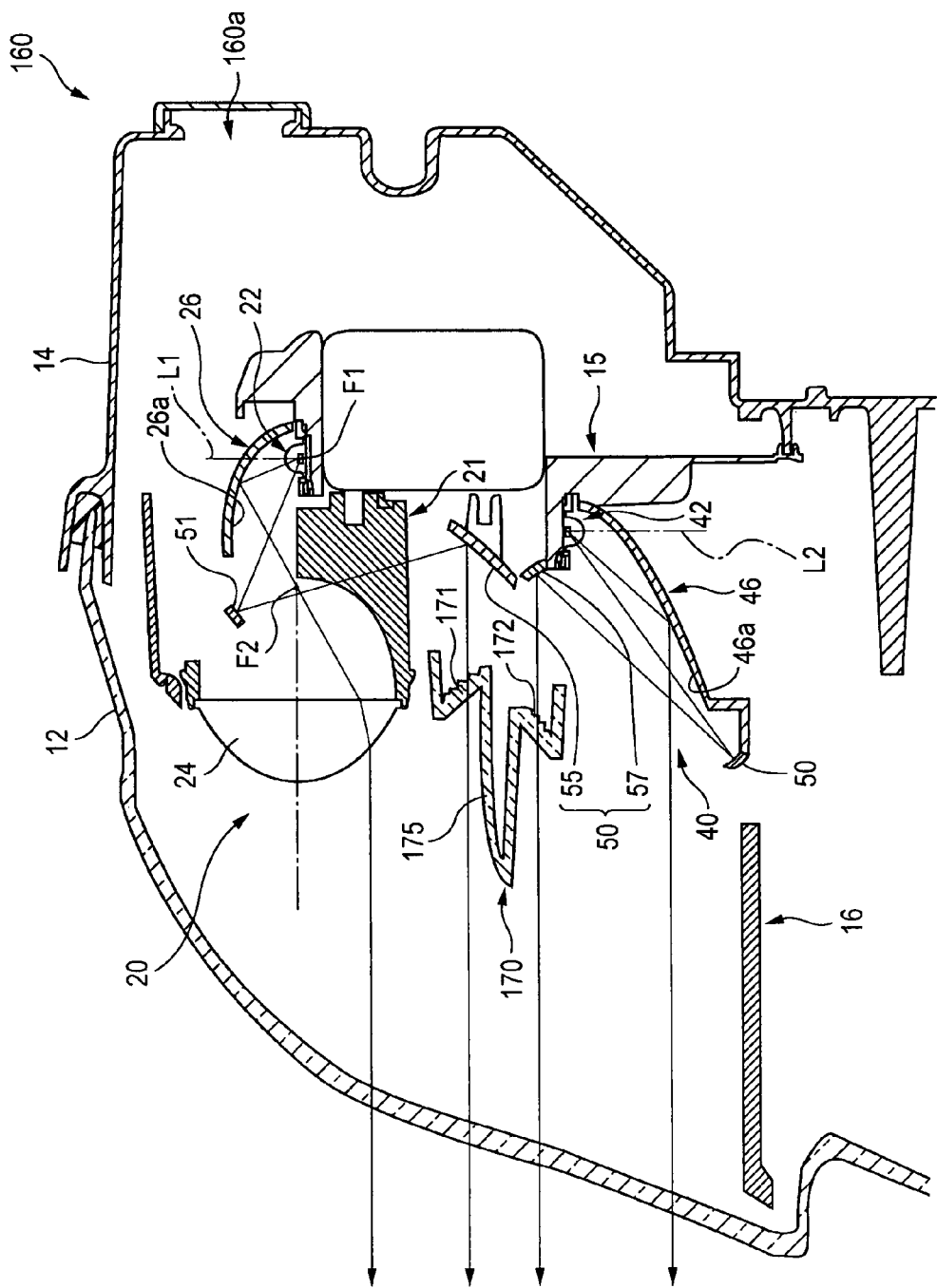
FIG. 7 is a vertical sectional view of a vehicle lamp according to a fourth exemplary embodiment of the invention.
Figure 8:
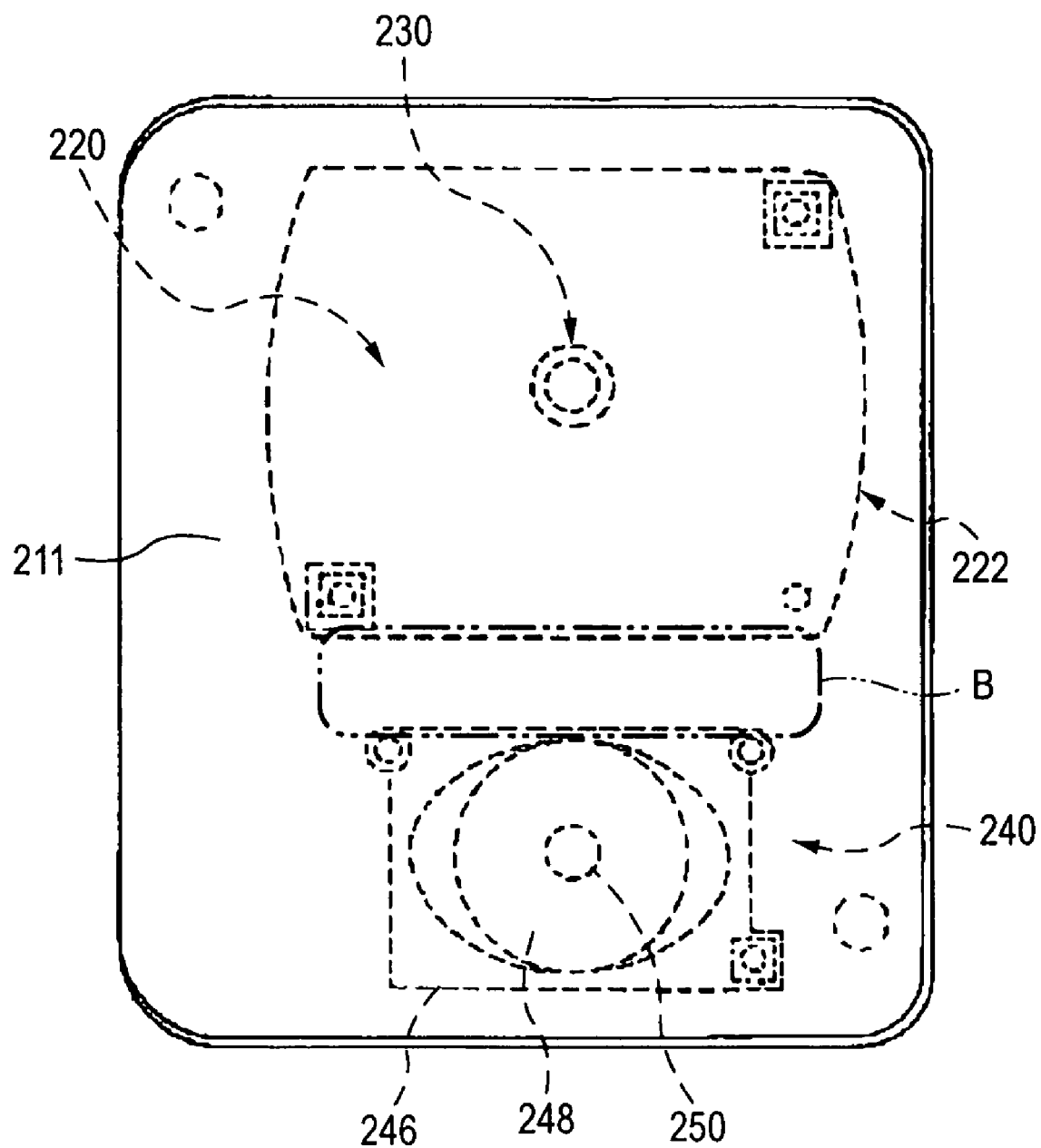
FIG. 8 is a front view of a vehicle lamp of a background art.
Figure 9:
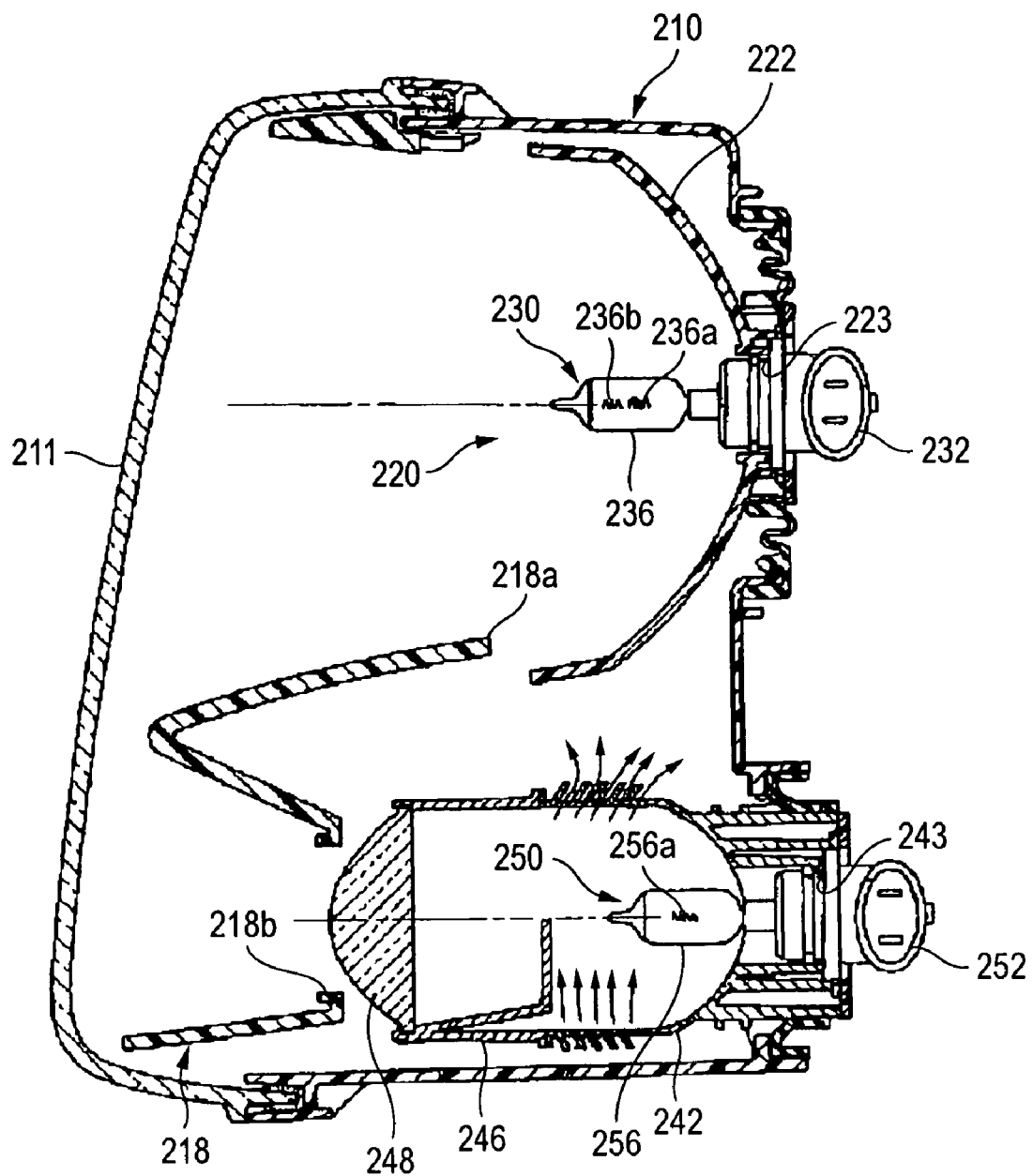
FIG. 9 is a vertical sectional view of the vehicle lamp shown in FIG. 8.

FIG. 7 is a vertical sectional view of a vehicle lamp according to a fourth exemplary embodiment of the invention.

As shown by FIG. 7, a vehicle lamp 160 of the fourth exemplary embodiment is constructed by a constitution substantially similar to the vehicle lamp 10 of the first exemplary embodiment except that a diffusing member 175 constituting a waveguide constituting an additional optical unit 170 is added at inside of a lamp chamber 160a surrounded by the light transmitting cover 12 and the lamp body 14. Hence, constituent members similar to those of the vehicle lamp 10 of the first exemplary embodiment are attached with the same notations and a detailed explanation thereof will be omitted.

The additional optical unit 170 according to the fourth exemplary embodiment includes a fourth additional reflector 55 for reflecting light reflected by the second additional reflector 51 to irradiate to the front side, a fifth additional reflector 57 for reflecting light reflected by the third additional reflector 53 to irradiate to the front side, and the diffusing member 175 including a first diffusing portion 171 and a second diffusing portion 172 for diffusing light reflected by the fourth additional reflector 55 and the fifth additional reflector 57.

Hence, light reflected by the fourth additional reflector 55 is diffused to be irradiated by the first diffusing portion 171 of the diffusing member 175, and light reflected by the fifth additional reflector 57 is diffused to be irradiated by the second diffusing portion 172 of the diffusing member 175.

That is, the additional optical unit according to the vehicle lamp of the invention can be constituted only by the additional reflectors of the fourth additional reflector and the fifth additional reflector for receiving light irradiated at least one of the first unit and the second unit to irradiate to the front side as in the vehicle lamps 10, 70, 110 of the first through the third exemplary embodiments, or can be constituted by the additional reflector and the waveguide of the diffusing member or the like arranged in front of the additional reflector.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:
a first unit including a first light source and a first main reflector for reflecting light from the first light source to a front side;
a second unit including a second light source and a second main reflector for reflecting light from the second light source to the front side, wherein a light emitting region of the first unit and a light emitting region of the second unit are arranged to be separated from each other; and
an additional optical unit for receiving light irradiated from at least one of the first unit and the second unit to irradiate to a front side and provided between the first unit and the second unit;
wherein the additional optical unit is arranged such that a light emitting region of the additional optical unit connects the light emitting region of the first unit and the light emitting region of the second unit to be optically recognized as a single light emitting region as a whole,
wherein the additional optical unit is disposed substantially the same distance from the front side as at least one of the first and second light sources.

2. The vehicle lamp according to claim 1, wherein the first light source comprises a first semiconductor light emitting element, and the second light source comprises a second semiconductor light emitting element.

3. The vehicle lamp according to claim 2, wherein the first unit and the second unit are arranged such that an attaching face of the first semiconductor light emitting element and an attaching face of the second semiconductor light emitting element are opposed to each other.

4. The vehicle lamp according to claim 2, wherein an irradiating axis of the first semiconductor light emitting element is substantially orthogonal to an irradiating direction of the first unit;
wherein an irradiating axis of the second semiconductor light emitting element is substantially orthogonal to an irradiating direction of the second unit;
wherein a second additional reflector for reflecting light from the first semiconductor light emitting element to the additional optical unit is provided on a side of the irradiating axis of the first semiconductor light emitting element; and
wherein a third additional reflector for reflecting light from the second semiconductor light emitting element to the additional optical unit is provided on a side of the irradiating axis of the second semiconductor light emitting element.

5. The vehicle lamp according to claim 4, wherein the additional optical unit includes a fourth additional reflector for reflecting light reflected by the second additional reflector to irradiate to the front side, and a fifth additional reflector for reflecting light reflected by the third additional reflector to irradiate to the front side.

6. The vehicle lamp according to claim 1, wherein the first unit further comprises a first projecting lens arranged to project light from the first light source substantially in parallel,
wherein the first projecting lens is disposed separate from the light emitting region of the second unit.

7. The vehicle lamp according to claim 1, wherein the first unit further comprises a first projecting lens arranged to project light from the first light source substantially in parallel, and
wherein the second unit further comprises a second projecting lens arranged to project light from the second light source substantially in parallel.

8. The vehicle lamp according to claim 7, wherein the light emitting region of the first unit is an area of the first projecting lens which is seen from a front side, and
wherein the light emitting region of the second unit is an area of the second projecting lens which is seen from the front side.

9. The vehicle lamp according to claim 1, wherein the additional optical unit receives light from the first unit and the second unit.

10. The vehicle lamp according to claim 1, further comprising a diffusing device for diffusing light irradiated from the additional optical unit.

11. The vehicle lamp according to claim 10, wherein the diffusing device comprises a waveguide.

12. A vehicle lamp comprising:
a first unit including a first light source and a first main reflector for reflecting light from the first light source to a front side;
a second unit including a second light source and a second main reflector for reflecting light from the second light source to the front side, wherein a light emitting region of the first unit and a light emitting region of the second unit are arranged to be separated from each other; and
an additional optical unit for receiving light irradiated from at least one of the first unit and the second unit to irradiate to a front side and provided between the first unit and the second unit;
wherein the additional optical unit is arranged such that a light emitting region of the additional optical unit connects the light emitting region of the first unit and the light emitting region of the second unit to be optically recognized as a single light emitting region as a whole,
wherein the first light source comprises a first semiconductor light emitting element, and the second light source comprises a second semiconductor light emitting element,
wherein an irradiating axis of the first semiconductor light emitting element is substantially orthogonal to an irradiating direction of the first unit;
wherein an irradiating axis of the second semiconductor light emitting element is substantially orthogonal to an irradiating direction of the second unit;
wherein a second additional reflector for reflecting light from the first semiconductor light emitting element to the additional optical unit is provided on a side of the irradiating axis of the first semiconductor light emitting element; and
wherein a third additional reflector for reflecting light from the second semiconductor light emitting element to the additional optical unit is provided on a side of the irradiating axis of the second semiconductor light emitting element,
wherein the second and third additional reflectors are disposed closer to the front side than the additional optical unit.

13. A vehicle lamp comprising:
a first unit including a first light source and a first main reflector for reflecting light from the first light source to a front side;
a second unit including a second light source and a second main reflector for reflecting light from the second light source to the front side, wherein a light emitting region of the first unit and a light emitting region of the second unit are arranged to be separated from each other; and
an additional optical unit for receiving light irradiated from at least one of the first unit and the second unit to irradiate to a front side and provided between the first unit and the second unit;
wherein the additional optical unit is arranged such that a light emitting region of the additional optical unit connects the light emitting region of the first unit and the light emitting region of the second unit to be optically recognized as a single light emitting region as a whole,
wherein the first main reflector comprises a reflecting face having a vertical sectional shape substantially in an elliptical shape with a first focal point in a vicinity of the first light source and a second focal point,
wherein the first unit comprises a projecting lens, a rear side focal point of the projecting lens being arranged in a vicinity of the second focal point of the reflecting face of the first main reflector, and
wherein the second main reflector comprises a reflecting face formed substantially in a paraboloid of revolution shape with a focal point in a vicinity of the second light source.

14. The vehicle lamp according to claim 13, wherein the light emitting region of the first unit is an area of the projecting lens which is seen from a front side, and
wherein the light emitting region of the second unit is an area of the reflecting face of the second main reflector seen from the front side.

15. A vehicle lamp comprising:
a first unit including a first light source and a first main reflector for reflecting light from the first light source to a front side;
a second unit including a second light source and a second main reflector for reflecting light from the second light source to the front side, wherein a light emitting region of the first unit and a light emitting region of the second unit are arranged to be separated from each other; and
an additional optical unit for receiving light irradiated from at least one of the first unit and the second unit to irradiate to a front side and provided between the first unit and the second unit;
wherein the additional optical unit is arranged such that a light emitting region of the additional optical unit connects the light emitting region of the first unit and the light emitting region of the second unit to be optically recognized as a single light emitting region as a whole, wherein the first main reflector comprises a reflecting face formed substantially in a paraboloid of revolution shape with a focal point in a vicinity of the first light source, and wherein the second main reflector comprises a reflecting face formed substantially in a paraboloid of revolution shape with a focal point in a vicinity of the second light source.

16. The vehicle lamp according to claim 15, wherein the light emitting region of the first unit is an area of the reflecting face of the first main reflector seen from a front side, and wherein the light emitting region of the second unit is an area of the reflecting face of the second main reflector seen from a front side.

* * * * *